(12) United States Patent
Parazak

(10) Patent No.: US 7,387,362 B2
(45) Date of Patent: Jun. 17, 2008

(54) METHODS AND ARCHITECTURE FOR APPLYING SELF-ASSEMBLED MONOLAYER(S)

(75) Inventor: Dennis P. Parazak, Oceanside, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 460 days.

(21) Appl. No.: 11/084,492

(22) Filed: Mar. 18, 2005

(65) Prior Publication Data

US 2006/0209117 A1    Sep. 21, 2006

(51) Int. Cl.
*B41J 2/135*    (2006.01)
*B41J 2/015*    (2006.01)

(52) U.S. Cl. .......................................... 347/45; 347/21

(58) Field of Classification Search .................. 347/33, 347/28, 21, 45
See application file for complete search history.

(56) References Cited

U.S. PATENT DOCUMENTS

| 6,102,521 | A  | * | 8/2000  | Halko et al. ................. 347/47 |
| 6,224,186 | B1 |   | 5/2001  | Johnson et al. |
| 6,296,344 | B1 |   | 10/2001 | Sharma et al. |
| 6,325,490 | B1 |   | 12/2001 | Yang et al. |
| 6,345,881 | B1 |   | 2/2002  | Yang et al. |
| 6,364,456 | B1 |   | 4/2002  | Yang et al. |
| 6,378,981 | B1 |   | 4/2002  | Wenzel et al. |
| 6,669,327 | B1 |   | 12/2003 | Harper |
| 6,808,745 | B2 |   | 10/2004 | Yang |
| 6,814,422 | B2 |   | 11/2004 | Bruch et al. |
| 2001/0043251 | A1 | | 11/2001 | Hood et al. |

FOREIGN PATENT DOCUMENTS

| EP | 0 992 355 A | 4/2000 |
| EP | 1 110 622 A | 6/2001 |
| EP | 1 118 465 A | 7/2001 |

OTHER PUBLICATIONS

Self-assembled monolayer, Wikipedia encyclopedia (google search, Aug. 13, 2007).*
Ion-Gated Electron Transfer in Self-Assembled Monolayer Films, J.Am.Chem.Soc.1996,118,10211-10219, Dean J. Campbell, Brian R. Herr, John C. Hulteen, Richard P. Van Duyne, and Chad A. Mirkin.

* cited by examiner

*Primary Examiner*—Shih-Wen Hsieh

(57) ABSTRACT

The present invention is drawn to methods and architecture for depositing one or more self-assembled monolayer(s) onto a print nozzle orifice plate surface. In particular, the servicing fluid includes a self-assembled monolayer-forming agent and is applied using a wiper. The wiper is configured to service and maintain an orifice plate surface having a pre-existing self-assembled monolayer, or for initial application of a self-assembled monolayer to an orifice plate.

36 Claims, No Drawings

METHODS AND ARCHITECTURE FOR APPLYING SELF-ASSEMBLED MONOLAYER(S)

FIELD OF THE INVENTION

The present invention is drawn to systems and methods for applying compositions onto an ink-jet printhead. In particular, the invention is related to systems and methods for wiping a self-assembled monolayer-forming agent onto an ink-jet printhead surface, such as at or around its jetting orifice.

BACKGROUND OF THE INVENTION

Ink-jet printing involves the placement of small drops of a fluid ink onto a media surface in response to a digital signal. Most ink-jet printers create printed images using print architecture, also commonly referred to as pens, which eject or jet small ink droplets through a printhead orifice onto a print media surface without physical contact between the printhead and print media surface. Some ink-jet printers contain a plurality of pens, each of which are dedicated to jetting a specific color of ink, and thus, in combination can provide a full color image. Generally, with one type of ink-jet printer, there is provided a pen having an ink reservoir which travels along a printing path with the pen in order to supply the pen with appropriate ink at appropriate times. Alternatively the ink reservoir is stationary the ink is fluidly coupled to moving printheads via delivery tubes. In either case, usually, a printer includes a single pen which is typically dedicated for jetting a black ink colorant, while a separate pen(s) is utilized for jetting cyan, magenta, yellow, and/or combinations or variations thereof.

As noted above, ink-jet pens typically include a printhead which has a plurality of tiny nozzles which displace or jet the ink onto the media surface. The nozzles are typically arranged in one or more linear or patterned arrays. For example, the nozzles (or orifices) can be a multi-linear array located side-by-side, parallel to one another, and substantially perpendicular to the printing direction. The printhead of a pen will also include an orifice plate which helps provide a smooth surface to aid in the printing performance. However, as the printhead passes over a print zone, the orifice plate tends to attract and pick-up contaminants, such as dust, paper fibers, paper debris, etc. The ejection of the ink through the orifice plate often causes ink accumulation which results in uncontrolled ink puddling. Ink puddling can result from misdirected drops, significant ink accumulation on the orifice plate, and pen servicing difficulties. As ink accumulation on the orifice plate can lead to print quality degradation, many methods have been developed to resolve these disadvantages and to improve print quality.

Of these methods, servicing print stations have been placed near the general printing mechanisms to aid in the ink and debris accumulation removal. However, servicing stations generally include cleaning the printhead with a wet and dry apparatus which in turn wears and/or damages protective layers that are sometimes applied to the printhead, thus diminishing the longevity and print quality exhibited by the printhead.

Another more complex approach to remedy the issue of ink accumulation is to apply a self-assembled monolayer onto the orifice plate surface. However, this approach provides only a temporary solution, as these materials are often easily damaged and are difficult to repair. For example, a single application of the self-assembled monolayer can be worn away or damaged after several cleaning installments, thus degrading the print quality once again. Part of the difficulty of repair comes from the fact that these materials are usually applied by dipping the orifice into an anti-wetting solution or spraying the anti-wetting solution onto the orifice. These approaches are difficult when an ink-jet pen is installed within a printer.

SUMMARY OF THE INVENTION

It has been recognized that it would be advantageous to devise methods and devices that improve the print quality of ink-jet printers and reduces the amount of ink accumulation on the orifice plate surface. In accordance with this, the present invention is drawn to a method for depositing a self-assembled monolayer onto an orifice plate surface, which comprises wiping a fluid onto the orifice plate surface. The fluid can include a self-assembled monolayer-forming agent.

In accordance with another embodiment of the present invention, a device is disclosed which provides an ink-jet maintenance architecture configured to wipe an office surface of an ink-jet printhead. The maintenance architecture includes a wiping mechanism or wiper fluidly coupled to at least one fluid reservoir. The fluid can comprise a self-assembled monolayer-forming agent and/or a servicing agent. The wiping mechanism or wiper is configured to dispose the fluid onto the orifice plate surface.

In yet another embodiment of the present invention, an ink-jet maintenance system can comprise a first ink-jet maintenance architecture configured to service an orifice plate surface of an ink-jet printhead. The first ink-jet maintenance architecture can include a first wiping mechanism or wiper fluidly coupled to at least a first fluid reservoir and configured to dispose a first fluid onto an orifice plate surface. The first fluid can comprise a servicing agent. This embodiment can also include a second ink-jet maintenance architecture being configured to apply a self-assembled monolayer on an orifice plate surface of an ink-jet printhead. The second ink-jet maintenance architecture includes a second wiping mechanism or wiper fluidly coupled to at least a second fluid reservoir containing a second fluid. The second ink-jet maintenance architecture can be configured to dispose the second fluid onto the orifice plate surface, and the second fluid can comprise a self-assembled monolayer-forming agent.

In another embodiment, a servicing fluid for wiping a self-assembled monolayer-forming agent onto an ink-jet printhead surface can comprise a self-assembled monolayer-forming agent and a servicing agent. The servicing fluid can be configured for application to the printhead by wiping, and can also be configured to form a self-assembled monolayer on the printhead surface, as well as clean the printhead surface.

Additional features and advantages of the invention will be apparent from the detailed description which illustrates, by way of example, features of the present invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a fluid" includes reference to one or more of such materials.

The term "about" when referring to a numerical value or range is intended to encompass the values resulting from experimental error that can occur when taking measurements.

The term "orifice plate" refers to the structure of a printhead that includes a jetting orifice(s) or nozzle(s) that is defined by a substrate. The term "plate" does not infer that the substrate can only be flat or plate-like. Any dimension of a substrate that includes at least one orifice or nozzle for jetting ink would be considered to be an orifice plate in accordance with embodiments of the present invention. Likewise, an "orifice plate surface" includes at least one surface comprising a jetting orifice or nozzle that is defined at least in part by plate surface.

The term "fluid" or "wiping fluid" means any fluid that may be applied to the orifice plate surface of a printhead by a wiping mechanism or wiper in accordance with embodiments of the present invention. The fluid can include a self-assembled monolayer forming agent, but may also or alternatively include other liquids, such as solvents or servicing agents, such as cleaning agents.

The term "self-assembled monolayer" or "SAM" are typically films that are one molecule thick. In accordance with embodiments of the present invention, self-assembled monolayers are non-wetting compositions that can be applied to an orifice plate surface to decrease ink accumulation. Self-assembled monolayers generally form single layers, as described above, but can be applied as multiple monolayers (multiple layers of monolayers).

The term "self-assembled monolayer-forming agent" means any composition or agent which is capable of forming a self-assembled monolayer on a substrate. For example, 1-hexadecanethiol is a self-assembled monolayer forming agent when applied to a metallic surface, such as gold, silver, copper, etc.

The term "servicing solution" means any liquid, mixture of liquids, or liquid solutions or dispersion that is normally used in the servicing, e.g., cleaning, of the printing mechanism. Such servicing solutions typically include servicing solvents, servicing surfactants, etc. In the context of the present invention, the servicing solution can include a self-assembled monolayer-forming agent.

The term "servicing agent" generally refers to compositions that are included in servicing solutions, and which are used to service a printhead or orifice plate. For example, a servicing agent can be a "servicing solvent" which can contribute to the dissolving and cleaning of ink compositions which have been left on a printhead device. A servicing agent can also be a "servicing surfactant" which promotes cleaning of the orifice plate. Polyethylene glycol (PEG), such as PEG 300, is a specific example of a servicing agent. Servicing agents in the context of the present invention specifically excludes self-assembled monolayer forming agents.

The term "wiping" or "wipe" means the action of spreading, disposing, or moving a fluid composition across a printhead or orifice plate surface using a wiping mechanism or wiper.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

The present invention is drawn towards a device, a system, and a method for depositing a self-assembled monolayer (SAM) onto a printhead or orifice plate surface. Particularly, the depositing of the self-assembled monolayer is carried out by wiping a fluid which includes a self-assembled monolayer-forming agent onto the orifice plate surface.

In one embodiment of the present invention, a method for applying the SAM composition having anti-wetting characteristics onto an orifice plate is disclosed. The method recites the step of wiping a fluid containing a self-assembled monolayer-forming agent onto an orifice plate surface.

In accordance with another embodiment of the present invention, a device is disclosed which provides an ink-jet maintenance architecture configured to wipe an office surface of an ink-jet printhead. The maintenance architecture includes a wiping mechanism or wiper fluidly coupled to at least one fluid reservoir. The fluid can comprise a self-assembled monolayer-forming agent and/or a servicing agent. The wiping mechanism or wiper is configured to dispose the fluid onto the orifice plate surface.

In another embodiment, a servicing fluid for wiping a self-assembled monolayer-forming agent onto an ink-jet printhead surface can comprise a self-assembled monolayer-forming agent and a servicing agent. The servicing fluid can be configured for application to the printhead by wiping, and can also be configured to form a self-assembled monolayer on the printhead surface, as well as clean the printhead surface.

Ink-jet printing systems may use a variety of printing or printhead mechanisms to produce print images using an ink. As explained above, the ink-jet printing mechanisms are generally known as "pens" which expel droplets of ink onto a print media in a predetermined pattern to create a desired image. After several uses, the printhead may become clogged and/or contaminated with dust and debris, thus degrading the printing performance. Most ink-jet printers provide a servicing station for cleaning and maintaining the printhead and nozzles. Generally, the servicing station is mounted at one end of the printer so the printhead can be moved to the station for maintenance. It is understood, however, that an ink-jet printer may also comprise a moving servicing device to accompany and service the printhead as it travels.

The cleaning and servicing of the pen or printing mechanism is typically performed by servicing or maintenance architecture when the printing mechanism is returned to its initial starting position. During non-printing periods, the maintenance architecture usually includes a capping system which seals the printhead nozzles from contaminants and drying. The maintenance architecture typically applies a solvent or cleaning agent to remove unwanted debris and dried or otherwise solidified ink. This architecture usually contains a dry wiping element. There are several types of wiping elements available for cleaning printhead surfaces. One such wiping element is a flexible blade wiping element. The flexible blade wiping element communicates with a fluid dispensing element, usually a wick impregnated or soaked with said fluid, to receive the solvent or cleaning solution. This flexible blade wiper generally receives the cleaning solution and relies upon the frictional force applied by the flexible blade to adequately clean and remove excess debris and dried or solidified ink. Another type of wiping element is a spring-loaded, non-bending wiper. The spring-loaded, non-bending wiper typically services a pen in the same fashion as the flexible wiper; however, the non-bending wiper relies upon the force applied by the spring to adequately clean the orifice plate surface. With printheads that include a self-assembled monolayer, when wiping, this monolayer can become worn and damaged after several servicing episodes.

As previously discussed, self-assembled monolayers are films or coatings of ordered molecular structures formed by the adsorption of a self-assembled monolayer-forming agent, e.g., active surfactant, onto a surface of interest. In one embodiment, these active surfactant molecules can interact and form covalent bonds between the molecule and the orifice place surface. For example, the SAM molecules can be terminated at one end with a functional group capable of bonding to an orifice plate surface and the opposing end can be terminated by moieties that determine the surface properties. The terminating end that interacts or forms bonds with the metal orifice plate is usually a moiety such as a thiol, disulfide, or sulfinate compound, which can be used in conjunction with a metal orifice plate. The metal orifice plate, which provides adequate binding surfaces, is generally comprised of a metal material selected from the group consisting of gold, platinum, copper, silver, palladium, and mixtures and alloys thereof. The terminating group that controls the surface properties of the self-assembled monolayer, i.e. distal to the metal orifice plate, is usually a straight hydrocarbon chain or fluorocarbon which causes the surface to be hydrophobic or non-wetting. Different degrees of wetting can be achieved for aqueous or non-aqueous liquids by modifying the functionality of this terminating group.

In accordance with embodiments of the present invention, self-assembled monolayers can be used to modify the orifice plate surface of a printhead to render the surface of the printhead as non-wetting or anti-wetting with respect to the ink-jet ink. This can greatly reduce or eliminate accumulation of the ink on the surface, and thus improving the orifice cleanliness, ink directionality, and print quality.

Chemical compounds which can be effective as self-assembled monolayer-forming agents are provided by U.S. Pat. No. 5,598,193, which is incorporated herein by reference in its entirety. These chemical compounds include, generally, thiols, disulfides, or sulfinates. For example, a polymer having a thiol, disulfide, or sulfinate group can be used. Suitable non-polar compounds can be aliphatic or aromatic hydrocarbons or a fluorocarbon, such as 1,1,2,2,-tetrahydroperfluoro-1-dodecanethiol, 1-octadecanethiol and 1-hexadecanethiol. Other hydrocarbon or fluorinated hydrocarbon materials, such as polymers or fluoropolymers that are capable of forming self-assembled films or layers can also be utilized as self-assembled monolayer-forming agents. For example, polymeric materials that include thiol, disulfide and/or sulfinate groups and hydrophobic pendent groups are useful in the present invention. According to one embodiment of the present invention, the self-assembled monolayer-forming agent can be selected from 1-hexadecanethiol, 1-tetradecanethiol, 1-dodecanethiol, 1-decanethiol, 1-octanethiol, 1-hexanethiol, octadecanethiol, and mixtures thereof. As mentioned, the self-assembled monolayer-forming agent can be used to replenish or repair damage of a previously present self-assembled monolayer, or can be used to apply an original layer, both by a wiping mechanism or wiper.

Servicing solutions incorporated into maintenance architecture systems aid in cleaning and maintaining printhead mechanisms. According to the present invention, a servicing agent is any formulation which is normally used in the routine servicing and cleaning of the printing mechanism. Typically, servicing agents contain servicing solvents, servicing surfactants, etc. In the present invention, the servicing solution may also include a self-assembled monolayer-forming fluid. Alternatively, a first servicing solution can be devoid of the self-assembled monolayer-forming agent, and the self-assembled monolayer-forming agent can be applied as a second servicing solution using separate architecture.

It has been recognized that application of a servicing solvent to a printhead can be used to clean a printhead, and further, will help improve the issue of dried or evaporated ink by reducing the rate of evaporation of water in the fluid, minimizing clogging or other properties of the fluid such as viscosity, pH, and surface tension, thereby rendering the printhead more easily cleanable. Preferably, in the present invention, non-volatile solvents are utilized. One or more of many solvents may be incorporated and used in many aspects of the present invention. Classes of solvents that can be used include alcohols and polyols, ketones, ethers, esters, lactams, derivatives thereof, and mixtures thereof. Specific examples of suitable servicing solvents include glycerol, 2-pyrrolidone, alkylene glycols such as ethylene glycols and propylene glycols, polyalkylenene glycols such as polyethylene glycols and polypropylene glycols, oxyalkylated alcohols, oxyalkylated fatty and organic acids, derivatives thereof, and mixtures thereof.

Surfactants or servicing surfactants can also be used in accordance with the present invention. Surfactants are compounds that contain hydrophilic and hydrophobic moieties. Thus, when a surfactant is added to water or another solvent or solvent system, the surface tension of the system can be reduced. In general, surfactants can be used for several purposes including wetting, as solubilizing agents, emulsifying, dispersing, foaming, cleaning, scouring, or lubricating a fluidic system. The servicing surfactants used in the present invention improve the servicing and maintaining qualities of the printhead. Non-limiting examples of commercially available surfactants which may be compatible in the present invention include fluorosurfactants, oxyalkylated alcohols, oxyalkylated fatty or organic acids and mixtures thereof.

According to one embodiment of the present invention, an ink-jet maintenance architecture configured to wipe an orifice plate surface of an ink-jet printhead is provided. The maintenance architecture includes a wiping mechanism or wiper fluidly coupled to at least one fluid reservoir containing a fluid capable of forming a self-assembled monolayer and configured to dispose the fluid onto an orifice plate surface. In a first embodiment, the fluid is the self-assembled monolayer-forming agent. In another embodiment, the fluid is a solution of a solvent and the self-assembled monolayer-forming agent. In still another embodiment, the fluid is a servicing fluid which includes servicing agent(s) and the self-assembled monolayer forming agent.

In accordance with these various combinations, to recite more detailed embodiments, the ink-jet maintenance architecture of the present invention can be a single wiping mechanism or wiper that includes a servicing solution that cleans and generally services a printhead, and also can be configured to apply, maintain, repair, and replenish the self-assembled monolayer(s) of an orifice plate surface. This can be done using a single wiping process. Optionally, the maintenance architecture can also include a plurality wiping mechanisms or wipers to sufficiently clean and generally service a printhead, as well as apply, maintain, repair, and replenish the orifice plate surface with the self-assembled monolayer(s). In this latter embodiment, the servicing agents can be present in a servicing solution, and the self-assembled monolayer-forming agent can be present in a separate fluid. In this manner, cleaning and general servicing can occur independently from addition or replenishment of the self-assembled monolayer. In other words, the architecture can include a servicing wiper dedicated to servicing and cleaning debris, while a second wiper can be dedicated to applying, replenishing, repairing, and/or maintaining the self-assembled monolayer.

In accordance with this latter embodiment, the maintenance architecture can include at least two wiping mechanisms or wipers which can be fluidly coupled to two fluid reservoirs, where one reservoir contains a fluid comprising a self-assembled monolayer-forming agent, and the other reservoir may be filled with any suitable fluid such as a servicing solution comprising a servicing agent of some type, e.g., solvent and/or surfactant.

As noted above, the present invention is also drawn towards methods and devices for applying a self-assembled monolayer onto an orifice plate surface. More specifically, the present invention discloses the approach of wiping a fluid containing a self-assembled monolayer-forming agent onto an orifice plate surface. In an exemplary embodiment, a self-assembled monolayer-forming agent is the dedicated fluid to be wiped on the orifice plate surface. Alternatively, in another embodiment, the self-assembled monolayer-forming agent may be dissolved or dispersed in at least one solvent. The incorporation of a solvent in the fluid being wiped is optimized for solubility of the self-assembled monolayer-forming agent and can be used to replenish the monolayer. In addition, the fluid for wiping the orifice plate can further include a servicing agent (which may be the solvent for optimizing or solubilizing the self-assembled monolayer forming agent as described above, or may be another servicing solvent), where the servicing agent is configured to enhance the cleaning abilities of the orifice plate surface. The servicing agent can be a servicing solvent or a servicing surfactant, as described previously.

In a more detailed aspect of the present invention, an ink-jet maintenance system is provided where a first ink-jet maintenance architecture can be configured to service an orifice plate surface of an ink-jet nozzle. The first ink-jet maintenance architecture can include a first wiping mechanism or wiper fluidly coupled to at least a first fluid reservoir and configured to dispose a first fluid onto an orifice plate surface. The first fluid reservoir generally contains a first fluid comprising a servicing agent. This embodiment can further include a second ink-jet maintenance architecture configured to apply a self-assembled monolayer on an orifice plate surface of an ink-jet nozzle. The second ink-jet maintenance architecture can provide a second wiping mechanism or wiper fluidly coupled to at least a second fluid reservoir. The second ink-jet maintenance architecture can be configured to dispose a second fluid onto an orifice plate surface, and the second fluid reservoir can contain a second fluid including a self-assembled monolayer-forming agent.

The first and second wiping mechanisms or wiper can be the same type of wiping mechanism or wiper. For example, both may be a flexible wiping element or a spring loaded wiping element. In the alternative, the first and second wiping mechanisms or wipers can be two different wipers of the same type, or can be two different types of wiping mechanisms.

At least one of the first fluid and second fluid may comprise a self-assembled monolayer-forming agent. For example, the first fluid may comprise a servicing agent configured to clean and remove ink and debris from the printhead, while the second fluid may be or contain a self-assembled monolayer-forming agent configured to apply, replenish, repair and restore a worn or damaged self-assembled monolayer on an orifice plate surface. Either fluid may contain a single composition, or be a fluid system that includes multiple fluids. For example, the self-assembled monolayer-forming agent in the second fluid may be dissolved in a solvent such as PEG 300, etc. Thus, the second fluid may be configured to replenish or repair a damaged or worn self-assembled monolayer on an orifice plate surface, and the first fluid can be configured for general cleaning and servicing. Alternatively, the first fluid can be used to service the orifice plate generally and/or carry out more minimal repairs, while the second fluid can be used to for initial application of the monolayer or for more difficult monolayer repairs. In this embodiment, the second fluid may be solely (or a high concentration of) the self-assembled monolayer-forming agent, and the first fluid may contain a smaller amount of the self-assembled monolayer-forming agent. Other variations are also possible as would be apparent to one skilled in the art after considering the present disclosure.

The following example illustrates at least one embodiment of the invention which is presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following example provides further detail in connection with what are presently deemed to be the most practical and preferred embodiments of the invention.

EXAMPLE

A fluid containing a self-assembled monolayer-forming agent is formed by dissolving 0.088 grams of 1-hexadecanethiol into 20.082 grams of 300 Mw polyethylene glycol (PEG300) at room temperature. The resulting formulation is a wiping fluid containing both a self-assembled monolayer-forming agent and a servicing solvent. The wiping fluid is applied to a printhead orifice plate containing a damaged self-assembled monolayer surface. Application of the wiping fluid is provided by a wiping mechanism or wiper containing a flexible wiping element. The wiping fluid replenishes and restores a damaged self assembled monolayer coating, and the replenished monolayer restores the non-wetting behavior on the orifice plate surface.

While the invention has been described with reference to certain preferred embodiments, those skilled in the art will appreciate that various modifications, changes, omissions, and substitutions can be made without departing from the spirit of the invention. For example, other servicing agents and additives can also be used which have functions of themselves and/or which aid in the formulation of the self-assembled monolayer forming agent into the servicing fluid. It is therefore intended that the invention be limited only by the scope of the appended claims.

What is claimed is:

1. A method for depositing a self-assembled monolayer onto an orifice plate surface, comprising wiping a servicing fluid onto the orifice plate surface, said fluid including a self-assembled monolayer-forming agent, wherein the wiping step is a replenishing step to repair a damaged or worn self-assembled monolayer on the orifice plate.

2. A method as in claim 1, wherein the servicing fluid is the self-assembled monolayer-forming agent.

3. A method as in claim 1, wherein the servicing fluid comprises the self-assembled monolayer-forming agent dissolved or dispersed in at least one solvent.

4. A method as in claim 1, wherein the servicing fluid further includes a servicing agent.

5. A method as in claim 4, wherein the servicing agent is configured to clean the orifice plate surface.

6. A method as in claim 4, wherein the servicing agent includes a compound selected from the group consisting of a servicing solvent, a servicing surfactant, and mixtures.

7. A method as in claim 6, wherein the servicing agent is the servicing solvent, said servicing solvent including a member selected from a group consisting of alcohols, polyols, ketones, ethers, esters, lactams, glycerol, 2-pyrrolidone, alkylene glycols, polyalkylenene glycols, oxyalkylated alcohols, oxyalkylated fatty and organic acids, derivatives thereof, and mixtures thereof.

8. A method as in claim 7, wherein the servicing solvent is also used to dissolve or disperse the self-assembled monolayer-forming agent.

9. A method as in claim 6, wherein the servicing agent is the servicing surfactant, said servicing surfactant being a fluorosurfactant.

10. A method as in claim 1, wherein the self-assembled monolayer-forming agent is selected from a group consisting of 1-hexadecanethiol, 1-tetradecanethiol, 1-dodecanethiol, 1-decanethiol, 1-octanethiol, 1-hexanethiol, 1-octadecanethiol, and mixtures thereof.

11. A method as in claim 1, wherein the orifice plate surface includes a metal selected from a group consisting of gold, platinum, copper, silver, palladium, and mixtures and alloys thereof.

12. An ink-jet maintenance architecture, wherein said architecture includes a wiper fluidly coupled to at least one fluid reservoir, said fluid reservoir containing a servicing fluid comprising a self-assembled monolayer-forming agent, said wiper being configured to wipe the fluid onto an orifice plate surface to replenish or repair a damaged or worn self-assembled monolayer on the orifice plate.

13. An ink-jet maintenance architecture as in claim 12, wherein the servicing fluid is the self-assembled monolayer-forming agent.

14. An ink-jet maintenance architecture as in claim 12, wherein the servicing fluid comprises the self-assembled monolayer-forming agent dissolved or dispersed in at least one solvent.

15. An ink-jet maintenance architecture as in claim 12, wherein the servicing fluid further includes a servicing agent.

16. An ink-jet maintenance architecture as in claim 15, wherein the servicing agent is configured to clean the orifice plate surface.

17. An ink-jet maintenance architecture as in claim 15, wherein the servicing agent includes a compound selected from the group consisting of a servicing solvent, a servicing surfactant, and mixtures.

18. An ink-jet maintenance architecture as in claim 17, wherein the servicing agent is the servicing solvent, said servicing solvent including a member selected from a group consisting of alcohols, polyols, ketones, ethers, esters, lactams, glycerol, 2-pyrrolidone, alkylene glycols, polyalkylenene glycols, oxyalkylated alcohols, oxyalkylated fatty and organic acids, derivatives thereof, and mixtures thereof.

19. An ink-jet maintenance architecture as in claim 18, wherein the servicing solvent is also used to dissolve or disperse the self-assembled monolayer-forming agent.

20. An inkjet maintenance architecture as in claim 17, wherein the servicing agent is the servicing surfactant, said servicing surfactant being a fluorosurfactant.

21. An ink-jet maintenance architecture as in claim 12, wherein the self-assembled monolayer-forming agent is selected from a group consisting of 1-hexadecanethiol, 1-tetradecanethiol, 1-dodecanethiol, 1-decanethiol, 1-octanethiol, 1-hexanethiol, 1-octadecanethiol, and mixtures thereof.

22. An ink-jet maintenance architecture as in claim 12, wherein the orifice plate surface includes a metal selected from a group consisting of gold, platinum, copper, silver, palladium, and mixtures and alloys thereof.

23. An ink-jet maintenance system, comprising:
a first ink-jet maintenance architecture configured to service an orifice-containing surface of an ink-jet nozzle, wherein said first ink-jot maintenance architecture includes a first wiper fluidly coupled to at least a first fluid reservoir, said first fluid reservoir containing a first fluid comprising a servicing agent, said first wiper being configured to wipe the first fluid onto the orifice-containing surface; and
a second ink-jet maintenance architecture configured to apply a self-assembled monolayer on an orifice plate surface of an ink-jet nozzle, wherein said second ink-jet maintenance architecture includes a second wiper fluidly coupled to at least a second fluid reservoir, said second fluid reservoir containing a second fluid comprising a self-assembled monolayer-forming agent, said second wiper being configured to wipe the second fluid onto the orifice plate surface.

24. An ink-jet maintenance system as in claim 23, wherein the first wiper and the second wiper are the same wiper.

25. An ink-jet maintenance system as in claim 23, wherein the second fluid comprises the self-assembled monolayer-forming agent dissolved or dispersed in at least one solvent.

26. An ink-jet maintenance system as in claim 23, wherein the servicing agent is configured to clean the orifice plate surface.

27. An ink-jet maintenance system as in claim 23, wherein the second fluid is configured to replenish or repair a damaged or worn self-assembled monolayer on the orifice plate, respectively.

28. An ink-jet maintenance system as in claim 23, wherein the orifice plate surface includes a metal selected from a group consisting of gold, platinum, copper, silver, palladium, and mixtures and alloys thereof.

29. An ink-jet maintenance system as in claim 23, wherein the first fluid does not include a self-assembled monolayer forming agent.

30. An ink-jet maintenance system as in claim 23, wherein the first fluid also includes a self-assembled monolayer forming agent, present at a lower concentration than the self-assembled monolayer forming agent of the second fluid.

31. A servicing fluid for use in wiping- a self-assembled monolayer-forming agent onto an ink-jet printhead surface, said servicing fluid comprising the self-assembled monolayer-forming agent and a servicing agent, said servicing fluid configured for application by wiping, and configured to:
 a) fair, a self-assembled monolayer on the printhead surface; and
 b) clean the printhead surface.

32. A servicing fluid as in claim 31, wherein the servicing agent includes a compound selected from the group consisting of a servicing solvent, a servicing surfactant, and mixtures.

33. A servicing fluid as in claim 32, wherein the servicing agent is the servicing solvent, and wherein the self-assembled monolayer forming agent is at least partially dissolved in the servicing solvent.

34. A servicing fluid as in claim 32, wherein the servicing agent is the servicing solvent, said servicing solvent including a member selected from a group consisting of alcohols, polyols, ketones, ethers, esters, lactains, glycerol, 2-pyrrolidone, alkylene glycols, polyalkylenene glycols, oxyalkylated alcohols, oxyalkylated fatty and organic acids, derivatives thereof, and mixtures thereof.

35. A servicing fluid as in claim 32, wherein the servicing agent is the servicing surfactant, said servicing surfactant being a fluorosurfactant.

36. A servicing fluid as in claim 31, wherein the self-assembled monolayer-forming agent is selected from a group consisting of 1-hexadecanethiol, 1-tetradecanethiol, 1-dodecanethiol, 1-decanethiol, 1-octanethiol, 1-hexanethiol, 1-octadecanethiol, and mixtures thereof.

* * * * *

UNITED STATES PATENT AND TRADEMARK OFFICE
CERTIFICATE OF CORRECTION

| | | |
|---|---|---|
| PATENT NO. | : 7,387,362 B2 | Page 1 of 1 |
| APPLICATION NO. | : 11/084492 | |
| DATED | : June 17, 2008 | |
| INVENTOR(S) | : Dennis P. Parazak | |

It is certified that error appears in the above-identified patent and that said Letters Patent is hereby corrected as shown below:

In column 10, line 15, in Claim 20, delete "inkjet" and insert --ink-jet--, therefor.

In column 10, line 31, in Claim 23, delete "ink-jot" and insert --ink-jet--, therefor.

In column 11, line 3, in Claim 31, delete "wiping- a" and insert --wiping a--, therefor.

In column 11, line 9, in Claim 31, delete "fair," and insert --form--, therefor.

In column 12, line 4, in Claim 34, delete "lactains" and insert --lactams--, therefor.

Signed and Sealed this
Third Day of July, 2012

David J. Kappos
*Director of the United States Patent and Trademark Office*